United States Patent [19]

Guergov

[11] Patent Number: 5,441,680
[45] Date of Patent: Aug. 15, 1995

[54] METHOD AND APPARATUS FOR INJECTION MOLDING

[76] Inventor: Milko G. Guergov, 615 Wahington, #5, Monroe, Mich. 48161

[21] Appl. No.: 236,471

[22] Filed: May 2, 1994

[51] Int. Cl.⁶ .......................................... B29C 45/34
[52] U.S. Cl. ................................ 264/40.1; 264/51; 264/85; 264/572; 264/328.1; 264/328.13; 425/4 R; 425/146; 425/546
[58] Field of Search ............... 264/40.1, 51, 85, 500, 264/572, 328.1, 328.13, DIG. 13; 425/145, 146, 546, 4 R

[56] References Cited

U.S. PATENT DOCUMENTS

| | | | |
|---|---|---|---|
| 3,044,118 | 7/1962 | Bernhardt et al. | 264/85 |
| 4,092,385 | 5/1978 | Balerski et al. | 264/328.7 |
| 4,208,368 | 6/1980 | Egli | 264/40.3 |
| 4,333,901 | 6/1982 | Young et al. | 264/85 |
| 4,675,141 | 6/1987 | Kumazaki | 264/85 |
| 4,685,872 | 8/1987 | Erlenbach | 425/146 |
| 4,942,006 | 7/1990 | Loren | 264/85 |

*Primary Examiner*—Jill L. Heitbrink
*Attorney, Agent, or Firm*—Brooks & Kushman

[57] ABSTRACT

A method of injection molding for use with an injection molding machine includes: (a) generating pressurized gas and pressurized moisture within molten plastic as plastic pellets are plasticized in the injection molding machine, the pressurized gas and the pressurized moisture having a total pressure defining an internal counterpressure within the molten plastic; (b) pressuring air within a cavity of a mold in the injection molding machine to an air pressure level which is substantially equal to the internal counterpressure in order to counterbalance the internal counterpressure as the molten plastic is injected into the cavity, thus providing a substantially pressure balanced molding environment for the plastic; and (c) maintaining the air pressure level in the cavity substantially constant as the molten plastic is injected into the cavity. A mold apparatus for use with the method of injection molding includes selectively sealed venting of the mold cavity, the vents being configured to maintain a substantially constant air pressure within the cavity as the cavity is filled with molten plastic.

21 Claims, 3 Drawing Sheets

PRESSURE DIFFERENCE PROFILE

METHOD AND APPARATUS FOR INJECTION MOLDING

TECHNICAL FIELD

This invention relates to injection molding and more particularly to a method and apparatus which uses stress and flow calculations and closed loop control devices to monitor and maintain optimum melt pressures of molten plastic as it is processed by an injection molding machine.

BACKGROUND ART

When molten plastic is processed by an injection molding machine, the plastic enters a mold cavity where it is cooled to form a desired part shape. As the cooling occurs, the plastic contracts within the cavity. As a result of this contraction, the part actually shrinks in size, and sink marks or low spots often occur on the surface of the part. Shrink and sink marks have caused major problems for injection molders since injection molding was first developed. Several methods have been developed in an attempt to eliminate these problems. Some examples include gas-assisted injection molding, structural foam molding, liquid gas assisted molding, etc. In addition, foaming agents have been used in the molding process for mixing with molten plastic in order to generate inert gases in the plastic. These gases provide internal pressure in the plastic which enables the plastic to more fully fill the cavity of the mold and packs the plastic against the cavity walls. This, in turn, helps reduce sink on the surface of the plastic parts. Also, gas counterpressure in the mold cavity has been used to improve surface smoothness of molded parts. These prior art methods are all problematic due to the large number of variables in the molding process. Varying injection pressures and injection speeds, varying melt pressures and temperatures, varying cavity conditions, and uncontrolled venting of gases all contribute to an unstable molding environment. These various problems in the molding process create burning and scission of polymer chains and create internal stresses within the plastic which remain in the plastic as the plastic material cools in the cavity. These internal stresses cause shrink, sink, and warpage of the plastic part to be molded. In addition, these various molding problems lead to degradation of the plastic material as it is processed through an injection molding machine. In general, erratic variations in pressure, temperature, and injection speed create material breakdown and cause internal problems in the plastic which show up in the final product as molded.

Another disadvantage of prior art systems is that the plastic melt flow in these systems faces changes in pressure due to changes in cavity geometry as the molten plastic moves into the cavity of the mold. These pressure changes cause certain areas of the cavity to be filled more quickly then other areas, thus resulting in different cooling characteristics in different areas of the cavity. These cooling variations cause inconsistency in the direction of plastic solidification, which results in surface stresses, weld lines or sink.

It is desirable to develop a more balanced injection molding process in which the pressure of the molten plastic is more tightly and evenly controlled as the plastic moves through the injection molding machine. It is further desirable to develop an injection molding process in which pressures acting upon the plastic are balanced in order to eliminate the above referenced problems caused by variations in polymer chain conditions, in order to reduce internal stresses in the plastic. The ultimate goal of such an injection molding process would be to produce a final product which nearly perfectly matches the cavity surface of the mold and is fully relieved of internal stresses which lead to shrink, sink and warpage thereof and has greatly improved mechanical properties. In addition, part weight may be reduced, which will provide significant material savings to the manufacturers.

DISCLOSURE OF THE INVENTION

A method of injection molding is provided for use with an injection molding machine, comprising: (a) generating internal counterpressure within molten plastic as plastic pellets are plasticized in the injection molding machine; and (b) pressurizing air within a cavity of a mold in the injection molding machine to an air pressure level which is substantially equal to the internal counterpressure in order to counterbalance the internal counterpressure as the molten plastic is injected into the cavity, thus providing a substantially pressure-balanced molding environment for the plastic.

Further provided for use with an injection molding machine is a method of injection molding, comprising: generating pressurized gas and pressurized moisture within molten plastic as plastic pellets are plasticized in the injection molding machine, the pressurized gas and the pressurized moisture having a total pressure defining an internal counterpressure within the molten plastic; (b) pressurizing air within a cavity of a mold in the injection molding machine to an air pressure level which is substantially equal to the internal counterpressure in order to counterbalance the internal counterpressure as the molten plastic is injected into the cavity, thus providing a substantially pressure-balanced molding environment for the plastic; and (c) maintaining the air pressure level in the cavity substantially constant as the molten plastic is injected into the cavity.

Also provided for use with an injection molding machine is a method of injection molding, comprising: (a) calculating a maximum stress to be experienced by a shot of plastic to be molded in the injection molding machine, the stress being a result of a volumetric shrink occurring as the plastic is cooled in a cavity of a mold in the machine; (b) pressurizing a shot of plastic to a first melt pressure as the plastic is plasticized in a barrel of the injection molding machine, the first melt pressure being substantially equal to the calculated maximum stress; (c) pressurizing air within the cavity to an air pressure substantially equal to the first melt pressure; (d) commencing injection of the shot of plastic into the cavity in a laminar flow manner, wherein molten plastic flows into said cavity concentrically with respect to a point at which plastic enters the cavity; (e) increasing the melt pressure on the shot of plastic to a second melt pressure, while maintaining the air pressure within the cavity substantially constant, and maintaining a substantially constant difference between the air pressure within the cavity and the second melt pressure during a substantial portion of a period of time which the shot of plastic is being injected into the cavity; (f) sensing the first and second melt pressures and generating feedback signals indicative thereof; (g) receiving said feedback signals, comparing said feedback signals to reference values, and producing signals for controlling said first and second melt pressures; and (h) returning to step (b).

Also provided is a method of injection molding a plastic part for use with an injection molding machine, comprising: (a) forming a plurality of vents in a mold for use in the injection molding machine, the mold having a cavity formed therein, the vents being in fluid flow communication with the cavity of the mold to vent pressurized air from the cavity, while maintaining a substantially constant air pressure in the cavity, according to the following formula:

$$A = 0.24241 * W * \sqrt{T1} / (C * P1),$$

where A is a cross-sectional area of the vent, W is discharge of air through the vent in pounds per second, C is a coefficient of flow, P1 is the air pressure in the cavity in pounds per square inch, and T1 is a temperature in the cavity in degrees Fahrenheit; (b) forming a channel in the mold in fluid flow communication with the vents; (c) sealing the mold to prevent leakage of pressurized air from the cavity; (d) providing first and second valves in selective fluid flow communication with the channel formed by the mold, the first valve being selectively movable between a closed position wherein pressurized air is prevented from moving therethrough and an open position wherein pressurized air is allowed to enter the channel therethrough, and the second valve being selectively movable between a closed position wherein pressurized air is prevented from moving therethrough and an open position wherein pressurized air is allowed to discharge therethrough from the channel; (e) calculating a maximum stress to be experienced by a shot of plastic to be molded in the injection molding machine, the stress being a result of volumetric shrink occurring as the plastic is cooled in the cavity of the mold; (f) pressurizing a shot of molten plastic in a barrel of the injection molding machine to a first melt pressure, the first melt pressure being substantially equal to the maximum stress; (g) moving the first valve to the open position; (h) moving the second valve to the closed position; (i) introducing pressurized air through the first valve into the cavity until the air pressure in the cavity is equal to the first melt pressure; (j) moving the first valve to the closed position; (k) injecting the shot of plastic into the cavity; (l) increasing the melt pressure of the shot of plastic to a second melt pressure, thus creating a pressure difference between the second melt pressure and the gas pressure in the cavity; (m) maintaining the pressure difference between the second melt pressure and the air pressure in the cavity substantially constant for a substantial portion of a period of time in which plastic is being injected into the cavity; (n) moving the second valve to the open position to release pressurized air therethrough; and (o) returning to step (f).

Further provided is a mold for use in an injection molding machine, comprising a front half and a back half of the mold. The front half includes an aperture formed therethrough for receiving molten plastic from the injection molding machine. The front half and back half cooperate to form a cavity therebetween, and the cavity is in fluid flow communication with the aperture to receive molten plastic therefrom. A plurality of vents are formed in one of the back half and front half, the vents having first and second ends thereof. The first end of each of the plurality of vents is in fluid flow communication with the cavity. The vents are configured according to the following formula to maintain a substantially constant air pressure in the cavity as the cavity is being filled with plastic: $A = 0.24241 * W * \sqrt{T1} / (C * P1)$, where A is a cross-sectional area of a vent, W is discharge of pressurized air through the vent in pounds per second, C is a coefficient of flow, P1 is the air pressure in the cavity in pounds per square inch, and T1 is a temperature in the cavity in degrees Fahrenheit. A channel is formed in one of the back half and the front half, the channel being in fluid flow communication with the second end of each of the plurality of vents for transferring pressurized air into and out of the cavity through the vents. A pair of valves are provided in selective fluid flow communication with the channel. One of the pair of valves is adapted to selectively receive pressurized air from a pneumatic line to provide pressurized air to the channel, and the other of the pair of valves is adapted to selectively allow discharge of pressurized air from the channel. A seal is circumscribed around the cavity and positioned between the front half and back half to prevent discharge of pressurized air from the cavity between the front half and the back half of the mold as the cavity is being filled with molten plastic.

Accordingly, an object of the present invention is to provide a method of injection molding in which a pressure-balanced molding environment is provided for cooling the molten plastic. A further object of the present invention is to provide a method of injection molding in which degradation of plastic material is decreased as a result of improved processing controls.

Another object of the present invention is to provide a method of injection molding in which less turbulence is created as the molten plastic is injected into the cavity of a mold.

Yet another object of the present invention is to provide a method of injection molding in which surface stresses in the final product are greatly decreased.

A further object of the present invention is to provide a method of injection molding in which shrink, sink, and warpage of the molded part are reduced.

Another object of the present invention is to provide a method of injection molding in which molten plastic cools and solidifies in a consistent, directional manner.

Still another object of the present invention is to provide a method of injection molding in which processing cycle time is reduced, and part weight is reduced.

A still further object of the present invention is to provide a mold capable of maintaining a desired air pressure within a cavity thereof.

These and other features, objects and advantages of the present invention will become apparent upon reading the following description therefor together with reference to the accompanying drawings.

BEST MODES FOR CARRYING OUT THE INVENTION

Figure 1:
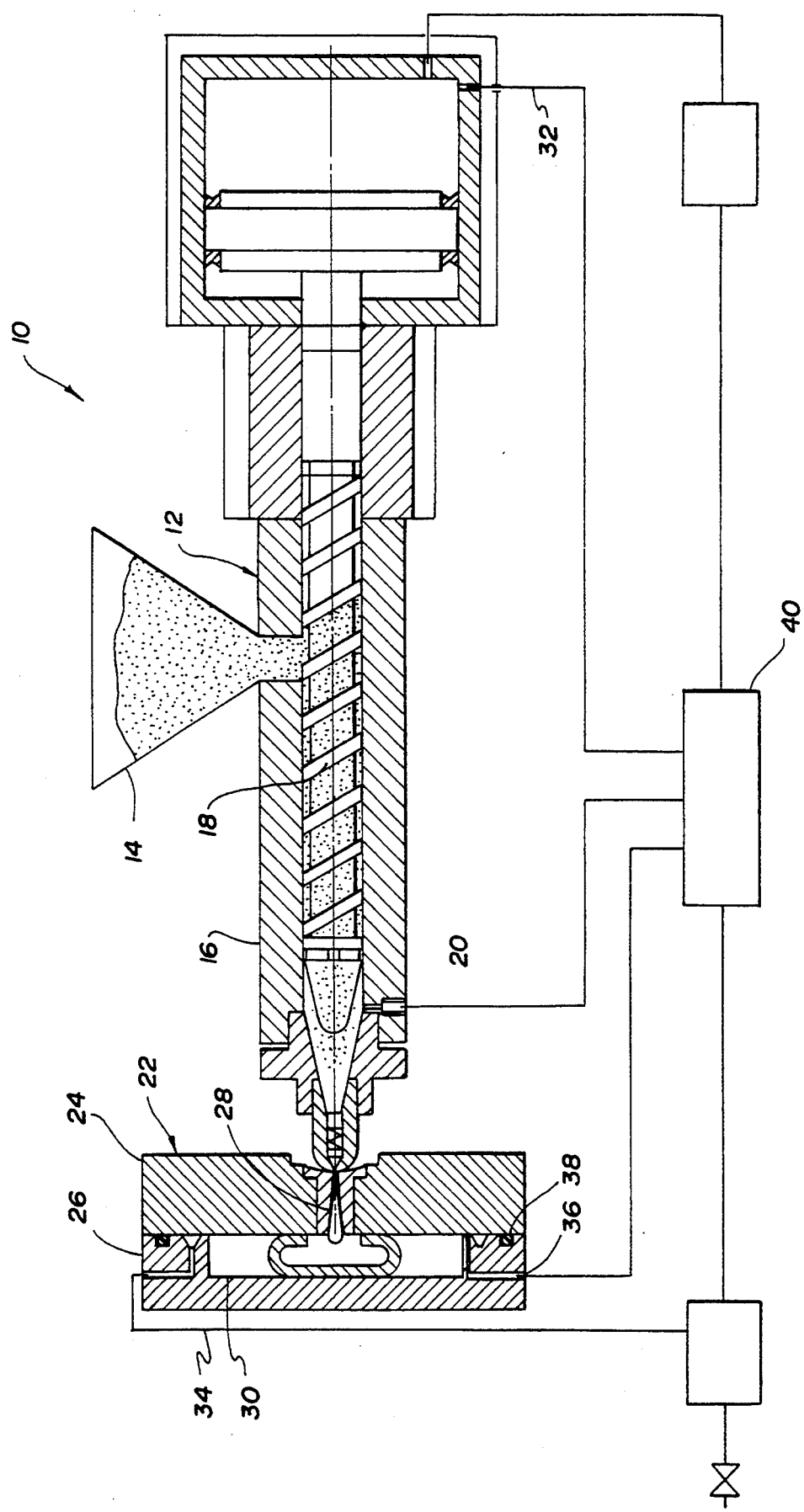
FIG. 1 is a schematic of an injection unit for an injection molding machine having a mold and pressure control system connected thereto according to the present invention.

Referring to FIG. 1, an injection molding machine 10 is shown, including an injection unit 12, for use with the present method. Plastic resin moves from the hopper 14 into the barrel 16 of the injection molding machine. Heat from the barrel 16 and rotational movement of the screw 18 cause the plastic resin to melt and form a shot of plastic to be molded by the machine. The shot of plastic is pressurized by the machine. The melt pressure of the shot of plastic is measured and regulated through a melt pressure transducer 20. A positive shutoff valve is provided at the tip of the barrel 16 in order to prevent drool of plastic through the nozzle and to allow pressurization of molten plastic in the barrel 16.

A mold 22 is inserted into the injection molding machine 10. The mold 22 includes a front half 24 and back half 26. The front half 24 has an aperture 28 formed therethrough for receiving the shot of molten plastic from the injection molding machine. The front half 24 and back half 26 of the mold 22 cooperate to form a cavity 30 therebetween. The cavity 30 is in fluid flow communication with the aperture 28 for receiving the shot of molten plastic therethrough. The shot of molten plastic is packed into the cavity 30 and held therein in order to cool and form a plastic part matching the shape of the cavity.

Transducers are provided for sensing pressures throughout the molding process. Injection pressure for the injection unit 12 is monitored by the injection pressure transducer 32. Air pressure is provided to the cavity 30 of the mold 22 through the pneumatic line 34. Air pressure in the cavity 30 is monitored by the air pressure transducer 36. The air pressure transducer is located in a vent so that a true pressure reading may be taken from the cavity. The vent with the pressure transducer will be discommunicated from the channel 44. A rubber seal 38 is provided between the front half and the back half 26 of the mold 22 to prevent escape of pressurized air from the cavity 30 of the mold. Often, when molten plastic is injected into a mold under high pressure, the front half 24 and back half 26 of a mold will separate slightly, thus allowing escape of air therefrom. The rubber seal 38 is designed to prevent this escape of pressurized air from the cavity.

A closed loop controller 40 is provided with the injection molding machine 10. The closed loop controller 40 receives pressure signals from the pressure transducers 20, 32, 36, compares these pressure signals to previously determined reference values, and sends signals to the injection molding machine to adjust the pressures accordingly.

Figure 2:
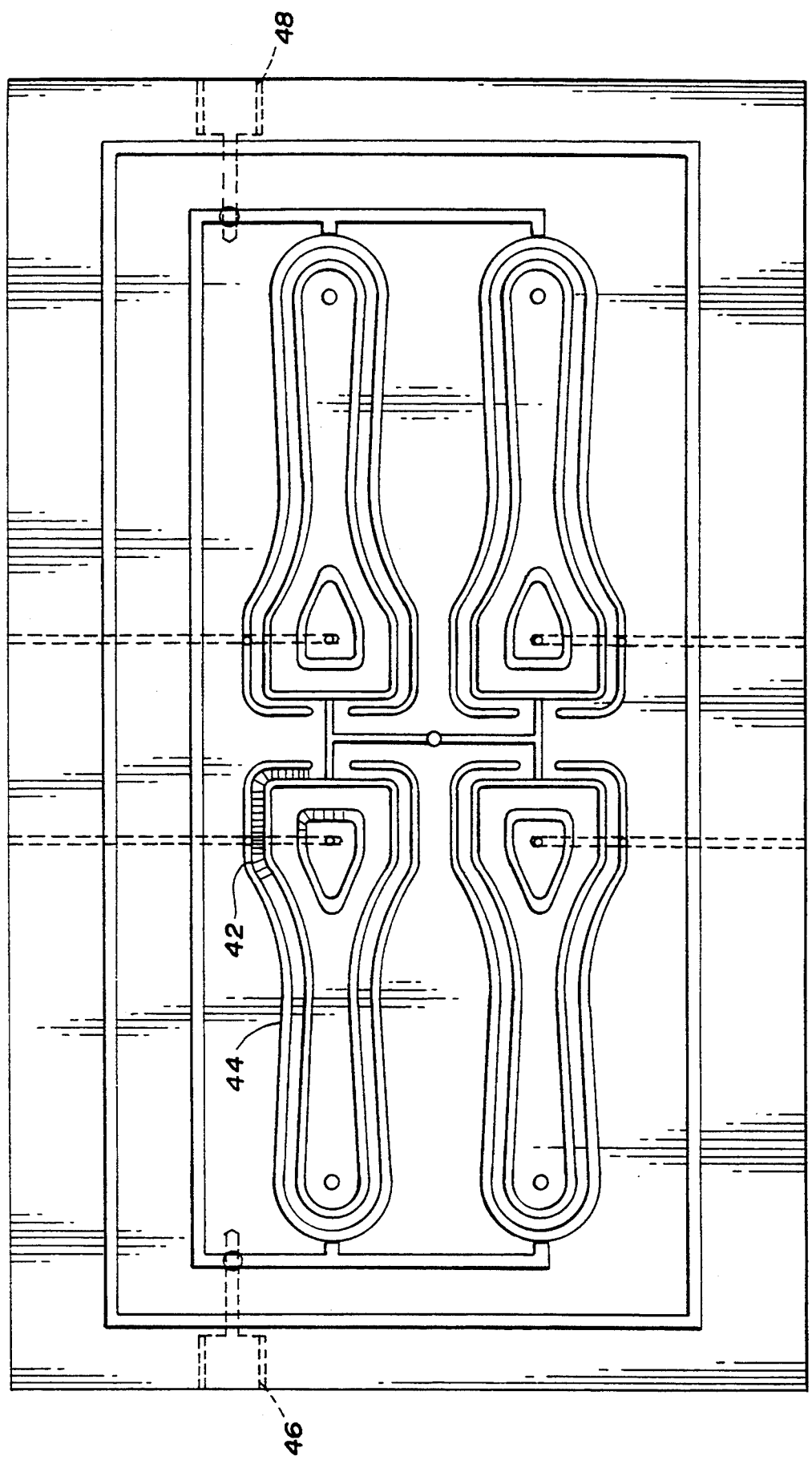
FIG. 2 is plan view of a back half of a mold according to the present invention.

Referring to FIG. 2, a plurality of vents 42 are shown in fluid flow communication with the cavity 30. The purpose of these vents is to allow discharge of pressurized air and gases as molten plastic is injected into the cavity 30. A channel 44 is provided around the cavity 30 in fluid flow communication with the vents 42. The pressurized air and gases move through the vents into the channel. A first valve 46 is provided in selective fluid flow communication with the channel 44 for providing pressurized air from the pneumatic line 34 to the channel 44. Similarly, a second valve 48 is provided in selective fluid flow communication with the channel 44 for release of pressurized air therefrom. The purpose of this sealed and valved venting system is to provide venting orifice controls immediately in front of the melt flow, rather than outside of the mold. In this manner, cavity air pressure may be provided to resist the melt pressure as molten plastic is injected into the cavity.

A method according to the present invention for use with the above described apparatus is based upon the fact that each volumetric unit of molten plastic injected into the cavity will shrink due to adjustment of surface tension forces during cooling, and substantial stresses will be built up in the solid part. These conditions may be alleviated by creation of entrained gases within the molten plastic. These entrained gases will act as a lubricator by substantially changing the fluidity of the melt and decreasing the amount of injection pressure required to inject the molten plastic into the cavity. The entrained gases cause the molten plastic to be much more pliable and easier to manipulate. Also, the predicted volumetric difference between the volume of the mold cavity and the volume of a solid part molded by the cavity can be used as a basis for premixing the molten plastic in the barrel at sufficient pressure to resist the volumetric shrink and eliminate the internal stresses.

By generating a certain desired amount of entrained gases and moisture within the molten plastic, a level of partial pressure of the entrained gases and moisture may be established at which movement of the pressurized gas and moisture will be stopped. Also, the decomposition of the gases may be stopped and the gases may be forced to maintain a static position by means of balanced surface tension forces. In addition, negative pressures in the solidifying plastic are eliminated.

The venting system shown in FIG. 2 creates the possibility of maintaining a constant gas pressure resistance in the cavity, which eliminates uneven flow distribution of the molten plastic in the cavity. The molten plastic will be distributed substantially concentrically in the cavity space with respect to the aperture 28. This provides the unique possibility for the melt to travel in the cavity and solidify in the cavity under the same pressure characteristics at all sections of the part. This also eliminates the possibility of gases entrained within the molten plastic traveling to the surface of the shot of plastic. The feeding rate of the molten plastic into the cavity is maintained constant in all areas of the cavity. This constant feeding rate along with the internal pressures created in the entrained gases and moisture provide the advantage of increasing the cooling rates because of earlier pressurized contact of the molten plastic with the cavity walls. This pressurized contact allows the molten plastic to cool more quickly as a result of heat dissipation through the walls of the cavity. Increased cooling rates result in substantial cycle time reduction which leads to considerable savings for the manufacturer.

Controlling the air pressure in the cavity of the mold provides the capability of establishing a balanced molding environment for the molten plastic. Processing the molten plastic under these conditions prevents degradation and scission of the polymers which are normally chemically attacked by decomposition products in the presence of moisture.

As a result of the pressure balance between the air pressure in the cavity and the melt pressure, the development of surface tension in the plastic is avoided. Effectively, this balanced pressure system creates a directional solidification of the plastic. In other words, the molten plastic cools in a constant, straight line from the surface of the molten plastic to the center of the plastic. This directional solidification eliminates surfaces stresses, which lead to shrink, sink and warpage of the part. The end result of this process is the production of a part which is free of shrink and sink, fully stress relieved, and a nearly exact copy of the cavity surface. Furthermore, this process produces parts having strong mechanical properties and configuration stability in addition to enhanced structural integrity.

In accordance with the most preferred embodiment of the present invention, a method of injection molding for use with an injection molding machine is provided. The first step is to calculate a maximum stress to be experienced by a shot of plastic to be molded in the injection molding machine 10, the stress being a result of volumetric shrink occurring as the plastic is cooled in the cavity 30 of the mold 22. Assuming that the part to be molded is an elongate rod having a rectangular cross-section, the following formulas apply. The maximum uniform load experienced by the part as a result of shrink is calculated as follows:

$$q = \frac{yEh^3 \left[ 1 + 1.05 \left( \frac{a}{b} \right)^5 \right]}{ka^4}$$

where q is a uniform load per unit area, a is width of the cavity, b is thickness of the cavity, h is height of the cavity, E is apparent modulus of elasticity of the plastic, k is a variable based upon heat deflection temperature of the plastic, and y is a shrinkage factor of the plastic.

The uniform load calculation equations will vary, depending upon the configuration of the part and the plastic to be processed. Of course, these formulas may be programmed into the machine controller so that the operator is only required to enter the properties of the plastic to process the machine.

A maximum mechanical stress to be experienced by the shot of plastic is then calculated in accordance with the maximum uniform load:

$$S \text{ (mechanical)} = \frac{qa^2}{2h^2 \left[ 1 + .0623 \left( \frac{a}{b} \right)^6 \right]}$$

where S (mechanical) is a maximum mechanical stress to be experienced by the part, a is width of the cavity, b is thickness of the cavity, h is height of the cavity, and q is the uniform load per unit area.

Again, the maximum mechanical stress calculation equations will vary depending upon part configuration and material type.

A maximum thermal stress to be experienced by the shot of plastic is then calculated in accordance with the following formula:

$$S \text{ (thermal)} = dT * L * E$$

where S (thermal) is a maximum thermal stress to be experienced by the part, dT is a change in the temperature of the plastic between room temperature and the temperature at which the plastic is in a plastic range of deformation, L is a thermal coefficient, and E is a modulus of elasticity of the plastic.

Finally, the maximum stress to be experienced by a shot of plastic is determined to be the greater value of S (mechanical) and S (thermal). The next step in the process is to pressurize a shot of plastic to a first melt pressure as the plastic is plasticized in the barrel 16 of the injection molding machine, the first melt pressure being substantially equal to the calculated maximum stress.

The cavity 30 is then pressurized to an air pressure which is substantially equal to the first melt pressure. Injection of the shot of plastic into the cavity is commenced after the air pressure has reached the first melt pressure. As the molten plastic enters the cavity 30, the air pressure in the cavity acts against the melt pressure in order to provide a pressure balance for the molten plastic.

Figure 4:
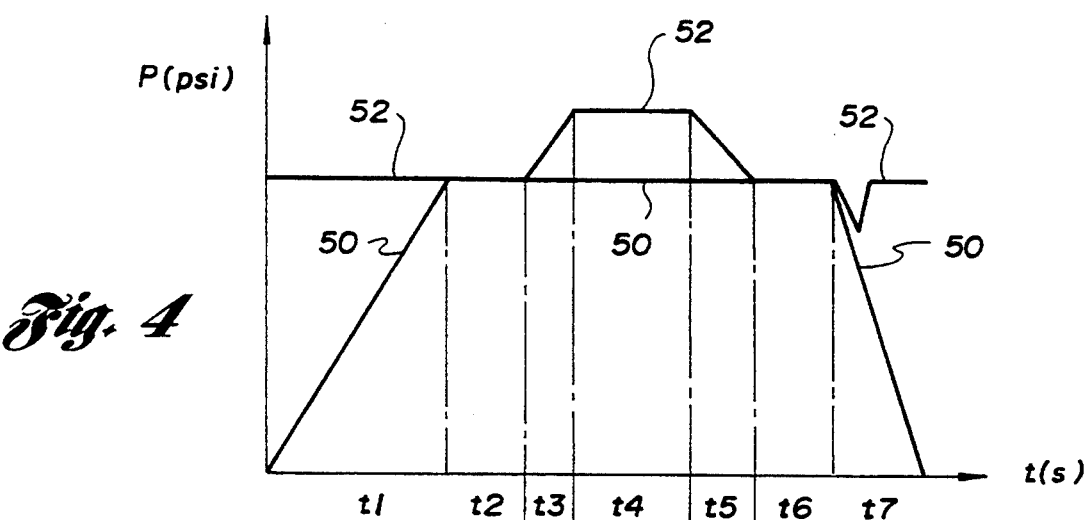
FIG. 4 is a graphical illustration of a melt pressure and air pressure cycle in an injection molding machine according to the present invention.
Figure 5:
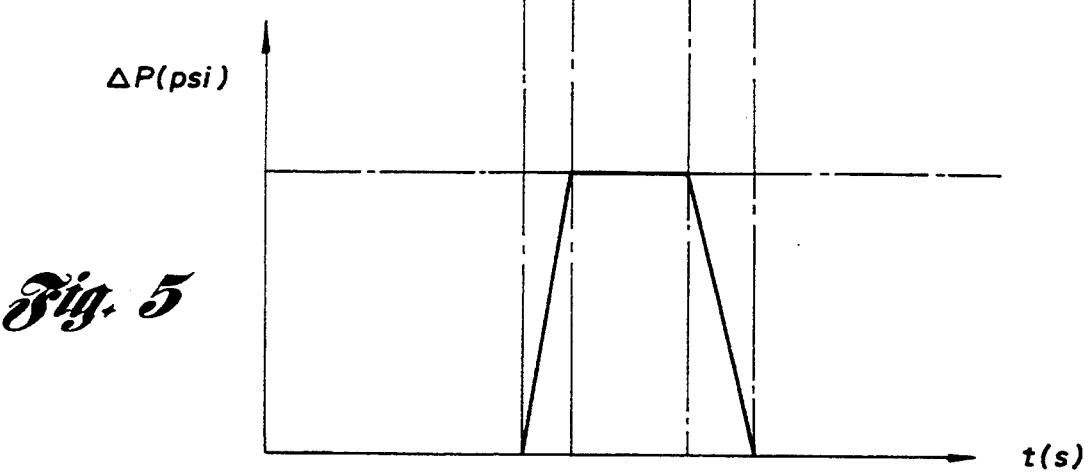
FIG. 5 is a graphical illustration of a pressure difference profile between a melt pressure and an air pressure in an injection molding machine according to the present invention.

As the shot of plastic is injected into the cavity, the melt pressure on the shot of plastic is increased from the first melt pressure to a second melt pressure, while maintaining the air pressure within the cavity substantially constant. In addition, a substantially constant difference between the air pressure within the cavity and the second melt pressure is maintained during a substantial portion of a period of time in which the shot of plastic is being injected into the cavity. Reference to FIGS. 4 and 5 further illustrates this method. Referring to FIG. 4, the air pressure 50 in the cavity and the melt pressure 52 of the molten plastic are illustrated as a function of time. During the period of time t1, the air pressure 50 is built up to equal the melt pressure 52. The time period t2 is a relaxation time to allow the air pressure to equalize with the melt pressure. During t3, injection of the molten plastic into the cavity begins and the melt pressure 52 increases from the first melt pressure to the second melt pressure. During t4, the pressure difference between the second melt pressure and the air pressure 50 is maintained substantially constant, as shown in FIG. 5. In the t5 period, the melt pressure 52 is decreased from the second melt pressure to the first melt pressure, and the two pressures are equalized during the t6 period. At t7, the air pressure 50 in the cavity is released and the next shot of plastic is prepared.

A closed loop controller 40 is provided to monitor the first and second melt pressures and the air pressure in the cavity, and to produce signals for maintaining the first and second melt pressures.

Finally, the method is repeated by returning to the step of pressurizing the next shot of plastic to a first melt pressure in the barrel 16. Accordingly, injection molded products are produced repeatedly.

It is further preferable to inject the shot of plastic into the cavity from the barrel 16 at relatively low rates. Manufacturers commonly provide suggested injection speeds within high and low speed values. It is desirable to inject a molten plastic into the cavity in the lower 10% of rates suggested by manufacturers in order to decrease turbulence and material degradation of the plastic. Similarly, manufacturers provide high and low injection pressure values. It is desirable to inject the plastic into the cavity at an injection pressure in the lower 10% of ranges suggested by manufacturers. Filling the cavity at low injection speeds and low injection pressures avoids destruction and degradation of the polymer chains.

A second embodiment of the present invention provides a method of injection molding for use with an injection molding machine, comprising: (a) forming a plurality of vents 42 in a mold for use in the injection molding machine, the mold having a cavity formed therein, the vents being in fluid flow communication with the cavity 30 of the mold to vent pressurized air from the cavity, while maintaining a substantially constant air pressure in the cavity, according to the following formula: $A = 0.24241 * W * \sqrt{T1}/(C * P1)$, where A is a cross-sectional area of the vent, W is discharge of air through the vent in pounds per second, C is a coefficient of flow, P1 is the air pressure in the cavity in pounds per square inch, and T1 is a temperature in the cavity in degrees fahrenheit; (b) forming a channel 44 in the mold in fluid flow communication with the vents 42; (c) sealing the mold to prevent leakage of pressurized air from the cavity and from the channel; (d) providing first and second valves 6, 48 in selective fluid flow communication with the channel 44 formed by the mold, the first valve 46 being selectively movable between a closed position wherein pressurized air is prevented from moving therethrough and an open position wherein pressurized air is allowed to enter the channel 44 therethrough, and the second valve 48 being selectively movable between a closed position wherein pressurized air is prevented from moving therethrough and an open position wherein pressurized air is allowed to discharge therethrough from the channel 44; (e) calculating a maximum stress to be experienced by a shot of plastic to be molded in the injection molding machine, the stress being the result of volumetric shrink occurring as the plastic is cooled in the cavity of the mold; (f) pressurizing a shot of molten plastic in the barrel 16 of the injection molding machine to a first melt pressure, the first melt pressure being substantially equal to the maximum stress; (g) moving the first valve 46 to the open position; (h) moving the second valve 48 to the closed position; (i) introducing pressurized air through the first valve 46 into the cavity 30 until the air pressure in the cavity is substantially equal to the first melt pressure; (j) moving the first valve to the closed position; (k) commencing injection of the shot of plastic into the cavity 30; (l) increasing the melt pressure of the shot of plastic to a second melt pressure; thus creating a pressure difference between the second melt pressure and the gas pressure in the cavity; (m) maintaining the pressure difference between the second melt pressure and the air pressure in the cavity substantially constant for a substantial portion of the period of time in which plastic is being injected into the cavity; (n) moving the second valve 48 to the open position to release pressurized air from the channel; and (o) returning to step (f).

It is understood that these steps need not necessarily be performed sequentially. Variations in the order of the steps provided in this method are contemplated as part of the present invention.

Reference to FIG. 4 provides a basis for description of the valves 46, 48 and the venting system as provided in the second embodiment of the present invention described above. Beginning with step (h) of the second embodiment of the present invention, the first valve 46 is moved to the open position and the second valve 48 is moved to the closed position prior to the time period t1 of FIG. 4. During the t1 period, pressurized air is introduced through the first valve 46 into the cavity 30 until the air pressure in the cavity is substantially equal to the first melt pressure. The first valve 46 is then moved to the closed position. The first and second valves remain closed as the molten plastic is injected into the cavity. A pressure difference is then established and maintained between the air pressure in the cavity and a second melt pressure for a substantial period of time (T4). The melt pressure and air pressure are then equalized (T5, T6), and then the second valve 48 is moved to the open position in order to release pressurized air from the channel (T7).

The purpose of this closed venting system is to provide a molding environment for the molten plastic wherein pressures acting upon each individual gas molecule are balanced so that very little movement of gas occurs within the plastic between adjacent molecules. This balance prevents gas molecules from moving toward the surface of the plastic or incorporating with other gas molecules to form larger voids or cells.

One skilled in the art will appreciate the utility of adding chemical blowing agents to the molten plastic. Chemical blowing agents are useful in controlling the amount of gas decomposed and entrained in the melt during plastification. These blowing agents generate inert gases when heated. The gases create voids in the material which can lead to substantial weight reduction of the part, and the pressure of these voids may be used to help fill the cavity and to pack out the plastic against the walls of the cavity.

Figure 3:
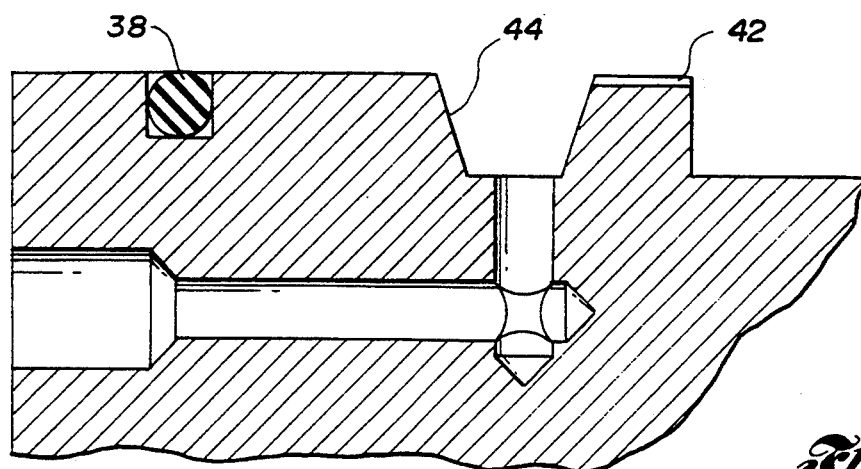
FIG. 3 is a vertical cross-sectional view taken through FIG. 2 of an injection mold according to the present invention.

Referring to FIGS. 1–3, a third embodiment of the present invention provides a mold 22 for use in an injection molding machine 10. The mold has a front half 24 and a back half 26, the front half 24 having an aperture 28 formed therethrough for receiving molten plastic from the injection molding machine. The front half 24 and the back half 26 cooperate to form a cavity 30 therebetween. The cavity 30 is in fluid flow communication with the aperture 28 to receive the molten plastic therefrom. A plurality of vents 42 are formed in the back half of the mold, as shown in FIG. 2. The vents 42 have first and second ends thereof. The first end of each of the plurality of vents is in fluid flow communication with the cavity 30. The vents are configured according to the following formula to maintain a substantially constant air pressure in the cavity 30 as the cavity is being filled with plastic: $A = 0.24241 * W * \sqrt{T1}/(C * P1)$, where A is a cross-sectional area of a vent, W is discharge of pressurized air through the vent in pounds per second, C is a coefficient of flow, P1 is the air pressure in the cavity in pounds per square inch, and T1 is a temperature in the cavity in degrees Fahrenheit.

A channel 44 is formed in the back half of the mold. The channel 44 is in fluid flow communication with the second end of each of the plurality of vents 42. The cavity 30, vents 42 and channel 44 are shown in FIG. 3. A pair of valves 46, 48 are in selective fluid flow communication with the channel 44. The first valve 46 is adapted to selectively receive pressurized air from a pneumatic line 34 to provide pressurized air to the channel 44. The second valve 48 is adapted to selectively allow discharge of pressurized air from the channel 44.

A rubber seal 38 is provided in the back half of the mold and circumscribes the cavity and the channel, and is positioned between the front half and back half to prevent discharge of pressurized air from the cavity and from the channel as the cavity is being filled with molten plastic. Upon injection, the front half and back half of the mold have a tendency to separate slightly. The rubber seal 38 prevents leakage of pressurized air from the cavity when this separation occurs.

While the best modes for practicing the invention have been described in detail, those familiar with the art to which this invention relates will recognize various alternative designs and embodiments for practicing the invention as defined by the following claims.

What is claimed is:

1. For use with an injection molding machine, a method of injection molding, comprising:
   generating internal counterpressure within molten plastic as plastic pellets are plasticized in the injection molding machine; and
   pressurizing air within a cavity of a mold in the injection molding machine to an air pressure level which is substantially equal to said internal counterpressure in order to counterbalance said internal counterpressure as said molten plastic is injected into said cavity, thus providing a substantially pressure-balanced molding environment for the plastic; and
   injecting said molten plastic into said cavity.

2. For use with an injection molding machine, a method of injection molding, comprising:
   generating entrained, pressurized gas and pressurized moisture within molten plastic as plastic pellets are plasticized in the injection molding machine, said pressurized gas and pressurized moisture having a total pressure defining an internal counterpressure within said molten plastic;
   pressurizing air within a cavity of a mold in the injection molding machine to an air pressure level which is substantially equal to said internal counterpressure in order to counterbalance said internal counterpressure as said molten plastic is injected into said cavity, thus providing a substantially pressure-balanced molding environment for the plastic; and
   maintaining said air pressure level in the cavity substantially constant as said molten plastic is injected into said cavity.

3. For use with an injection molding machine, a method of injection molding, comprising:
   a) determining a maximum stress to be experienced by a shot of plastic to be molded in the injection molding machine, said stress being a result of volumetric shrink occurring as the plastic is cooled in a cavity of a mold in the machine;
   b) pressurizing a shot of plastic to a first melt pressure as the plastic is plasticized in a barrel of the injection molding machine, said first melt pressure being substantially equal to said calculated maximum stress;
   c) pressurizing air within said cavity to an air pressure substantially equal to said first melt pressure;
   d) commencing injection of said shot of plastic into the cavity in a laminar flow manner, wherein molten plastic flows into said cavity concentrically with respect to a point at which plastic enters the cavity;
   e) increasing the melt pressure on said shot of plastic to a second melt pressure, while maintaining said air pressure within said cavity substantially constant, and maintaining a substantially constant difference between said air pressure within said cavity and said second melt pressure during a substantial portion of a predetermined period of time in which said shot of plastic is being injected into the cavity;
   f) sensing said first and second melt pressures and generating feedback signals indicative thereof;
   g) receiving said feedback signals, comparing said feedback signals to reference values, and generating signals for controlling said first and second melt pressures; and
   h) returning to step (b).

4. The method of claim 3, wherein the step of determining a maximum stress to be experienced by a shot of plastic to be molded in the injection molding machine comprises:
   calculating a maximum uniform load to be experienced by a shot of plastic in accordance with the following formula:

$$q = \frac{yEh^3 \left[ 1 + 1.05 \left( \frac{a}{b} \right)^5 \right]}{ka^4}$$

where q is a uniform load per unit area, a is width of the cavity, b is thickness of the cavity, h is height of the cavity, E is apparent modulus of elasticity of the plastic, k is a variable based upon heat deflection temperature of the plastic, and y is a shrinkage factor of the plastic;
   calculating a maximum mechanical stress to be experienced by a shot of plastic in accordance with the following formula:

$$S \text{ (mechanical)} = \frac{qa^2}{2h^2 \left[ 1 + .0623 \left( \frac{a}{b} \right)^6 \right]}$$

where S (mechanical) is a maximum mechanical stress to be experienced by the part, and q is the uniform load per unit area, a is width of the cavity, b is thickness of the cavity, h is height of the cavity;
   calculating a maximum thermal stress to be experienced by a shot of plastic in accordance with the following formula:

$$S(\text{thermal}) = dT * L * E$$

where S(thermal) is a maximum thermal stress to be experienced by the part, dT is a change in temperature of the plastic between room temperature and the temperature at which the plastic is in a plastic range of deformation, L is a thermal coefficient, E is a modulus of elasticity; and
   setting the maximum stress to be experienced by a shot of plastic equal to the greater value of S(mechanical) and S(thermal).

5. The method of claim 3, further comprising:
   prior to step (b), selecting a plastic material normally injection moldable at injection speeds within predetermined high and low speed values; and
   after step (d), injecting said plastic into said cavity at an injection speed closer to said low speed value than to said high speed value.

6. The method of claim 3, further comprising:
   prior to step (b), selecting a plastic material normally injection moldable at injection pressures within predetermined high and low pressure values; and
   after step (d), injecting said plastic into said cavity under an injection pressure closer to said low pressure value than to said high pressure value.

7. The method of claim 3, further comprising adding a blowing agent to the plastic prior to injection of the plastic into the cavity.

8. For use with an injection molding machine, a method of injection molding, comprising:
   a) forming a plurality of vents in a mold for use in the injection molding machine, the mold having a cavity formed therein, said vents being in fluid flow communication with said cavity of the mold to vent pressurized air from the cavity, while maintaining a substantially constant air pressure in the cavity, according to the following formula:

$$A = 0.24241 * W * (\text{square root } T1)/C * P1$$

where A is a cross-sectional area of the vent, W is discharge of air through the vent in pounds per second, C is a coefficient of flow, P1 is the air pressure in the cavity in pounds per square inch, and T1 is a temperature in the cavity in degrees Fahrenheit;
   b) forming a channel in said mold in fluid flow communication with said vents;
   c) sealing the mold to prevent leakage of pressurized air from said cavity and from said channel;
   d) providing first and second valves in selective fluid flow communication with said channel formed by the mold, said first valve being selectively movable between a closed position wherein pressurized air is prevented from moving therethrough and an open position wherein pressurized air is allowed to enter the channel therethrough, and said second valve being selectively movable between a closed position wherein pressurized air is prevented from moving therethrough and an open position wherein pressurized air is allowed to discharge therethrough from the channel;
   e) calculating a maximum stress to be experienced by a shot of plastic to be molded in the injection molding machine, said stress being a result of volumetric shrink occurring as the plastic is cooled in the cavity of the mold;
   f) pressurizing a shot of molten plastic in a barrel of the injection molding machine to a first melt pressure, said first melt pressure being substantially equal to said maximum stress;
   g) moving said first valve to said open position;
   h) moving said second valve to said closed position;
   i) introducing pressurized air through said first valve into the cavity until the air pressure in the cavity is substantially equal to said first melt pressure;
   j) moving said first valve to said closed position;
   k) commencing injection of said shot of plastic into the cavity;
   l) increasing the melt pressure of the shot of plastic to a second melt pressure, thus creating a pressure difference between the second melt pressure and the gas pressure in the cavity;
   m) maintaining said pressure difference between the second melt pressure and the air pressure in the cavity substantially constant for a substantial portion of a period of time which plastic is being injected into the cavity;
   n) moving the second valve to said open position to release pressurized air therethrough from said channel; and
   o) returning to step (f).

9. The method of claim 8, wherein the step of calculating a maximum stress to be experienced by a shot of plastic to be molded in the injection molding machine comprises:
   calculating a maximum uniform load to be experienced by a shot of plastic;
   calculating a maximum mechanical stress to be experienced by a shot of plastic;
   calculating a maximum thermal stress to be experienced by a shot of plastic; and
   setting the maximum stress to be experienced by a shot of plastic equal to the greater value of the maximum mechanical stress or the maximum thermal stress.

10. The method of claim 8, wherein the step of calculating a maximum stress to be experienced by a shot of plastic to be molded in the injection molding machine comprises:
    calculating a maximum uniform load to be experienced by a shot of plastic in accordance with the following formula:

$$q = \frac{yEh^3 \left[1 + 1.05 \left(\frac{a}{b}\right)^5 \right]}{ka^4}$$

where q is a uniform load per unit area, a is width of the cavity, b is thickness of the cavity, h is height of the cavity, E is apparent modulus of elasticity of the plastic, k is a variable based upon heat deflection temperature of the plastic, and y is a shrinkage factor of the plastic;
    calculating a maximum mechanical stress to be experienced by a shot of plastic in accordance with the following formula:

$$S(\text{mechanical}) = \frac{qa^2}{2h^2 \left[1 + .0623 \left(\frac{a}{b}\right)^6 \right]}$$

where S(mechanical) is a maximum mechanical stress to be experienced by the part, and q is the uniform load per unit area, a is width of the cavity, b is thickness of the cavity, h is height of the cavity;
    calculating a maximum thermal stress to be experienced by a shot of plastic in accordance with the following formula:

$$S(\text{thermal}) = dT * L * E$$

where S(thermal) is a maximum thermal stress to be experienced by the part, dT is a change in temperature of the plastic between room temperature and the temperature at which the plastic is in a plastic range of deformation, L is a thermal coefficient, E is a modulus of elasticity; and
    setting the maximum stress to be experienced by a shot of plastic equal to the greater value of S(mechanical) and S(thermal).

11. The method of claim 8, further comprising:
    prior to step (f), selecting a plastic material normally injection moldable at injection speeds within predetermined high and low speed values; and
    after step (k), injecting said plastic into said cavity at an injection speed closer to said low speed value than to said high speed value.

12. The method of claim 8, further comprising:

prior to step (f), selecting a plastic material normally injection moldable at injection pressures within predetermined high and low pressure values; and after step (k), injecting said plastic into said cavity under an injection pressure closer to said low pressure value than to said high pressure value.

13. The method of claim 8, further comprising adding a blowing agent to the plastic prior to injection of the plastic into the cavity.

14. A method of reducing internal stresses in plastic parts formed in a mold cavity from molten plastic injected into the mold cavity by an injection molding apparatus, comprising the steps of:

pressurizing the cavity to a predetermined air pressure;

operating the injection molding apparatus to develop molten plastic at a first melt pressure equal to said predetermined air pressure;

communicating the molten plastic with the mold cavity when the predetermined air pressure and first melt pressure become equal; and subsequently increasing the melt pressure to a second melt pressure, and maintaining a substantially constant difference between said air pressure within the mold cavity and said second melt pressure during a substantial portion of a predetermined period of time in which the molten plastic is being injected into the mold cavity, whereby to optimize pressure conditions acting upon the molten plastic in a manner to reduce internal stresses in the plastic parts being formed.

15. A method of injection molding for use with an injection molding machine including a mold with a cavity formed therein for receiving molten plastic and a hydraulic unit for creating an injection pressure to fill the mold cavity with molten plastic at a predetermined melt pressure, comprising:

supplying air to the cavity at a predetermined air pressure;

sensing the melt pressure during injection;

sensing the air pressure in the cavity during injection; and providing a closed loop controller to monitor the sensed melt pressure and sensed air pressure and to produce signals to be sent to the hydraulic unit for maintaining the melt pressure at desired levels.

16. A method of injection molding for use with an injection molding machine including a mold therein, the method comprising:

determining a maximum stress to be experienced by plastic as the plastic is processed in the mold;

generating counterpressure within the plastic prior to injection of the plastic into the mold, said counterpressure being substantially equal to said determined maximum stress; and maintaining said counterpressure within the plastic at least equal to said determined maximum stress as said plastic is injected into the mold.

17. A method of injection molding for use with an injection molding machine including a mold with a cavity formed therein for receiving pressurized air and means for creating an injection pressure sufficient to fill the mold cavity with molten plastic, the molten plastic having a total pressure defining a melt pressure, the method comprising:

monitoring the pressure of air in the mold cavity;

monitoring the injection pressure while the mold cavity is being filled; and maintaining a substantially constant difference between the pressure of air in the cavity and the injection pressure while molten plastic is being injected into the cavity to optimize molding conditions.

18. A method of reducing internal stresses in parts formed in a mold cavity from molten plastic injected into the mold cavity comprising the steps of:

pressuring the cavity to a predetermined air pressure;

pressurizing the melt to a first pressure equal to the predetermined air pressure;

communicating the molten plastic to the cavity when the pressures become equal; and subsequently increasing the melt pressure to a second pressure for injection.

19. For use with an injection molding machine having a melt holder and a mold with a mold cavity formed therein, a method of injection molding, comprising:

generating internal counterpressure within molten plastic as plastic pellets are plasticized in the injection molding machine by preloading the molten plastic in the melt holder;

pressurizing air within the mold cavity to an air pressure level which is substantially equal to said internal counterpressure in order to counterbalance said internal counterpressure as said molten plastic is injected into said cavity, thus providing a substantially pressure-balanced molding environment for the plastic; and injecting said molten plastic into said cavity.

20. For use with an injection molding machine having a melt holder and a mold having a mold cavity formed therein, a method of injection molding, comprising:

generating entrained, pressurized gas and pressurized moisture within molten plastic as plastic pellets are plasticized in the injection molding machine by preloading the molten plastic in the melt holder, said pressurized gas and pressurized moisture having a total pressure defining an internal counterpressure within said molten plastic;

pressurizing air within the mold cavity to an air pressure level which is substantially equal to said internal counterpressure in order to counterbalance said internal counterpressure as said molten plastic is injected into said cavity, thus providing a substantially pressure-balanced molding environment for the plastic; and maintaining said air pressure level in the cavity substantially constant as said molten plastic is injected into said cavity.

21. A mold for use in an injection molding machine, comprising:

a front half and a back half of the mold, said front half having an aperture formed therethrough for receiving molten plastic from the injection molding machine, said front half and said back half cooperating to form a cavity therebetween, and said cavity being in fluid flow communication with said aperture to receive molten plastic therefrom;

a plurality of vents formed in one of said back half and said front half, said vents having first and second ends thereof, said first end of each of said plurality of vents being in fluid flow communication with said cavity, said vents being configured according to the following formula to maintain a substantially constant air pressure in said cavity as said cavity is being filled with plastic:

$$A = \frac{0.24241 * W * \sqrt{T1}}{C * P1}$$

where A is a cross-sectional area of a vent, W is discharge of pressurized air through the vent in pounds per second, C is a coefficient of flow, P1 is the air pressure in the cavity in pounds per square inch, and T1 is a temperature in the cavity in degrees Fahrenheit;

a channel formed in one of said back half and said front half, said channel being in fluid flow communication with said second end of each of said plurality of vents;

a pair of valves in selective fluid flow communication with said channel, one of said pair of valves adapted to selectively allow pressurized air to enter said channel, and the other of said pair of valves adapted to selectively allow discharge of pressurized air from said channel; and a seal circumscribing said cavity and said channel, and positioned between said front half and back half to prevent discharge of pressurized air from said cavity and said channel between said front half and said back half of the mold as said cavity is being filled with molten plastic.

* * * * *

REEXAMINATION CERTIFICATE (3180th)

United States Patent [19]

Guergov

[11] B1 5,441,680
[45] Certificate Issued Apr. 29, 1997

[54] METHOD AND APPARATUS FOR INJECTION MOLDING

[76] Inventor: Milko G. Guergov, 615 Wahington, #5, Monroe, Mich. 48161

Reexamination Request:
No. 90/004,351, Sep. 3, 1996

Reexamination Certificate for:
Patent No.: 5,441,680
Issued: Aug. 15, 1995
Appl. No.: 236,471
Filed: May 2, 1994

[51] Int. Cl.$^6$ .................................................. B29C 45/34
[52] U.S. Cl. .................... 264/40.1; 264/40.3; 264/51; 264/85; 264/572; 264/328.1; 264/328.13; 425/4 R; 425/146; 425/546
[58] Field of Search .................................................. 264/40.3

[56] References Cited

U.S. PATENT DOCUMENTS

| | | | |
|---|---|---|---|
| 3,268,635 | 8/1966 | Kraus et al. | 264/500 |
| 3,532,154 | 10/1970 | Balevski | 164/119 |
| 3,632,703 | 1/1972 | Sullivan et al. | 264/40.1 |
| 3,893,792 | 7/1975 | Laczko | 425/149 |
| 3,960,996 | 6/1976 | Balevski et al. | 264/37 |
| 4,153,231 | 5/1979 | Hayakawa et al. | 249/82 |
| 4,288,398 | 9/1981 | Lemelson | 264/443 |
| 4,312,820 | 1/1982 | Arnold et al. | 264/40.1 |
| 4,318,874 | 3/1982 | Lemelson | 264/40.1 |
| 4,636,084 | 1/1987 | Kopernicky | 366/76.9 |
| 4,750,409 | 6/1988 | Hendry | 92/158 |
| 4,852,028 | 7/1989 | Korpela et al. | 364/567 |
| 4,943,407 | 7/1990 | Hendry | 264/572 |
| 5,098,637 | 3/1992 | Hendry | 264/572 |
| 5,264,163 | 11/1993 | Lemelson | 264/40.1 |

OTHER PUBLICATIONS

"New Advancements in Counterpressure Structural Foam Processing", Michael Caropreso *Typical Clamp Requirements*, pp. 79–81, 1984.

*Primary Examiner*—Jill L. Heitbrink

[57] ABSTRACT

A method of injection molding for use with an injection molding machine includes: (a) generating pressurized gas and pressurized moisture within molten plastic as plastic pellets are plasticized in the injection molding machine, the pressurized gas and the pressurized moisture having a total pressure defining an internal counterpressure within the molten plastic; (b) pressuring air within a cavity of a mold in the injection molding machine to an air pressure level which is substantially equal to the internal counterpressure in order to counterbalance the internal counterpressure as the molten plastic is injected into the cavity, thus providing a substantially pressure balanced molding environment for the plastic; and (c) maintaining the air pressure level in the cavity substantially constant as the molten plastic is injected into the cavity. A mold apparatus for use with the method of injection molding includes selectively sealed venting of the mold cavity, the vents being configured to maintain a substantially constant air pressure within the cavity as the cavity is filled with molten plastic.

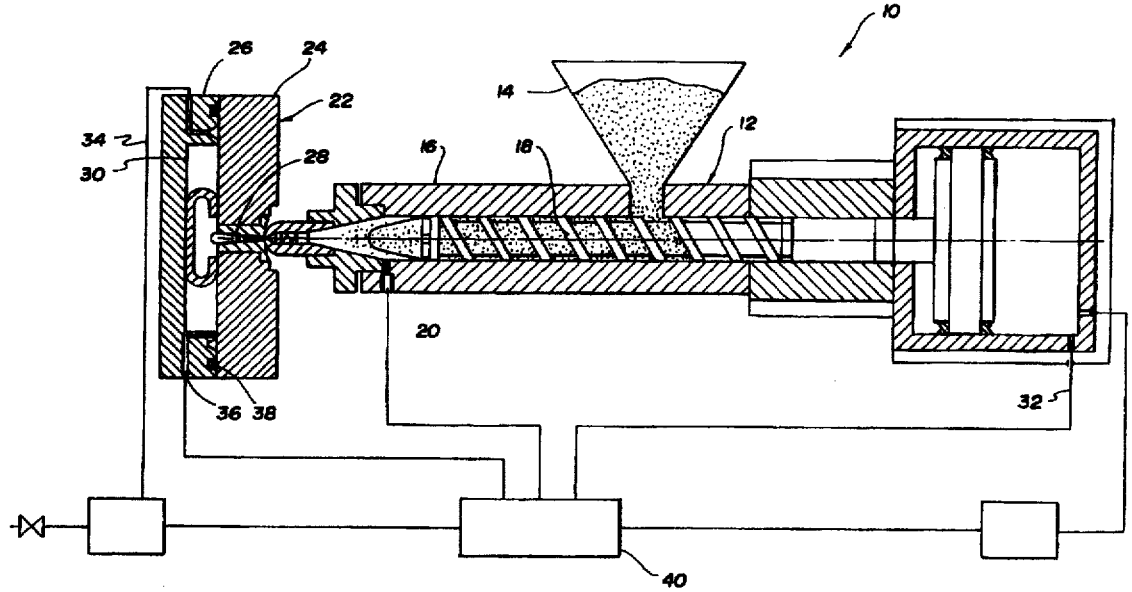

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–21 is confirmed.

* * * * *